UNITED STATES PATENT OFFICE.

FREDERICK MANN, OF KOROIT CREEK, BRAYBROOK, NEAR MELBOURNE, ASSIGNOR OF TWO-THIRDS OF HIS RIGHT TO ROBERT STEELE SCOTT, OF MELBOURNE, COLONY OF VICTORIA, AND THOMAS TOLLY JONES, OF LONDON, ENGLAND.

PROCESS OF MANUFACTURING NITRO-GLYCERINE.

SPECIFICATION forming part of Letters Patent No. 226,867, dated April 27, 1880.

Application filed January 23, 1878.

*To all whom it may concern:*

Be it known that I, FREDERICK MANN, of Koroit Creek, Braybrook, near Melbourne, in the Colony of Victoria, manufacturing chemist, have invented a new and useful Improvement in the Process of Manufacturing Nitro-Glycerine, which process is fully set forth in the following specification.

It is well known that nitro-glycerine is manufactured by the admixture of glycerine with nitric and sulphuric acids and the subsequent washing away of the waste acids in very cold water. This water is made very cold because of the strong tendency of the nitro-glycerine to decompose except when kept at a very low temperature. Notwithstanding the coldness of the water, however, there is a considerable heat engendered immediately the acids mix with the water. This heat injuriously affects the nitro-glycerine which accompanies the acids, causing its partial decomposition and lowering its quality.

Now, my invention has been designed for the express purpose of preventing this decomposition and lowering of the quality of the nitro-glycerine.

It consists in first crystallizing the nitro-glycerine by freezing before attempting to separate it from the acids, and then separating such crystals from such acids by a centrifugal washer, such as is used for the separation of sugar-crystals from molasses, or by any other of the machines now in use for separating crystals from liquids.

In making nitro-glycerine according to my invention the acids and glycerine may be mixed in any one of the methods commonly employed. When this has been done my invention comes into play, for, instead of conducting such mixture into a large quantity of very cold water, I subject it at once to a sufficiently low temperature to freeze or crystallize the nitro-glycerine contained therein, any of the known processes or machines being used for that purpose. This is not readily accomplished, but it is very greatly assisted if a very small portion—say a tea-spoonful—of previously-frozen nitro-glycerine be thrown into the vessel containing the mixture. The addition of frozen nitro-glycerine is not necessary except when making the first charge, inasmuch as sufficient frozen material clings to and remains on the sides of the vessel after the first charge for subsequent operations. The fact of its having frozen is known by a very sudden rise in the temperature of the mixture, which rise is indicated on a thermometer attached thereto. This rise will amount to several degrees—say from 15° to 25°—and is seen at a glance. When this has been accomplished I separate the crystallized nitro-glycerine from the waste acids by placing the whole in a centrifugal machine such as is commonly used for separating crystallized sugar from molasses. The crystallized nitro-glycerine thus obtained I then place in cold water, when it liquefies and sinks to the bottom, from whence it can be drawn, and after being purified by successive washings in cold water, and lastly in a weak and cold alkaline solution, in the manner well understood, it may be used for any purpose.

Having thus described my invention, what I claim as new, and desire to secure by Letters Patent, is—

The described method of separating nitro-glycerine from its acid mother liquid, consisting, essentially, in first freezing the mixed acids and nitro-glycerine, and then removing the crystallized nitro-glycerine from the waste acids, substantially as described.

FRED. MANN.

Witnesses:
EDWD. WATERS,
W. S. BAYSTON.